Feb. 11, 1969 G. W. KRIEG 3,427,050
COUPLING WITH BONDED LINER
Original Filed July 25, 1960

INVENTOR.
GALEN W. KRIEG
BY
Robert E. Breidenthal
ATTORNEY

United States Patent Office 3,427,050
Patented Feb. 11, 1969

3,427,050
COUPLING WITH BONDED LINER
Galen W. Krieg, 2631 Somerset Drive,
Wichita, Kans. 67204
Original application July 25, 1960, Ser. No. 44,932, now Patent No. 3,172,934, dated Mar. 9, 1965. Divided and this application Dec. 7, 1964, Ser. No. 416,341
U.S. Cl. 285—55                                1 Claim
Int. Cl. F16l 58/00, 21/04, 25/00

The instant invention relates to new and useful improvements in couplings or pipe joints, and more specifically pertains to the provision of a resilient and corrosion resistant liner securely bonded within the coupling and compressively biased between the coupled tubular members.

This application is a division of my copending application Ser. No. 44,932, now patent No. 3,172,934, entitled, Bonded Coupling Liner Fabrication and Installation Process, that was filed July 25, 1960.

It has heretofore been proposed that a resilient gasket can be disposed within a pipe coupling and be of such size as to be squeezed or compressed axially upon the joint being made up by tightening the conventional threaded connections. It has been found, during the course of extensive field experience with piping and conduit systems handling corrosive fluids, that a coupling employing a compressed gasket in accordance with the above proposal is frequently liable to commence leaking at a rapidly worsening rate after a period of time.

Investigation has indicated that such failures were at least in many instances probably due to an initially minute leakage or migration of corrosive fluid to a position radially intermediate the gasket and the coupling and/or to the threads between the coupling and one of the pipes joined thereby. Corrosion effected by the initial leakage enlarges the leakage path with resultant acceleration in the rate of the deterioration of the seal.

An important aim of this invention is to deny access of any initial leakage to surfaces the corrosion of which will result in a material rate of leakage.

A further important object of this invention is to provide a sealing construction adapted for resiliently biased sealing and which can be as axially extended as desired.

Still another purpose of the invention is to enable exactness in the degree of resilient bias, whereby the effectiveness of the seal can be maximized particularly in relation to an extended period of use.

Yet another aim to be specifically enumerated is the provision of a coupling seal in accordance with the foregoing that will minimize fluid turbulence through the coupling, and which will reduce the deleterious effects of fluids containing abrasive solids.

An additional object of the invention is the provision of a coupling well adapted to withstand both high and vacuum internal pressures therein without any necessity for reinforcing of the liner or gasket.

Broadly, the invention involves a coupling having a resilient and corrosion resistant liner therein, said liner having an external surface complementary to the internal surface of the coupling and being securely bonded thereto, with at least a part of such internal bonded surface being threaded. Preferably, according to the invention, the threaded surface constitutes a continuation of threads by means of which the coupling is adapted for threaded connection to the threaded end of a section of pipe. Though not essential, it is strongly preferred that the threaded connection be of the conventional tapered type.

More specifically, the invention involves a pipe threaded into the coupling to its limiting position in which the end of the pipe compresses the liner axially and in which the extreme threads of the pipe at least partly enter threads of the coupling in which the liner is bonded.

The coupling of the invention can constitute the terminal portion of a length of pipe or simply be a short tubular member threaded at its opposite ends for threaded connection to adjacent ends of lengths of pipe joined thereby in end to end relation. In the former case, according to the preferred form of the invention, the coupling is provided with an internal shoulder that faces toward the threaded portion of the coupling, and the liner is bonded to the shoulder. In the latter case, the previous comments made with respect to one end of the coupling can be applied to both ends of the coupling as the same is double ended, or alternatively, the end of a pipe threaded into one end of the coupling can be considered for some purposes the equivalent of the above described shoulder.

The invention preferably, though not necessarily, also involves the liner not only abutting and being bonded to the shoulder but also the liner includes a lip portion overlapping the shoulder to feather out or taper out in thickness and thereby smoothly merge to the configuration of the interior of the pipe, with the overlapping portion or lip of the liner also being bonded to the interior of the coupling or pipe section.

The invention and its best mode of practice will be best understood upon reference to the accompanying drawings illustrative of preferred embodiments thereof, wherein FIGURE 1 is a central longitudinal sectional view showing in use a coupling according to the invention;

Figure 1:
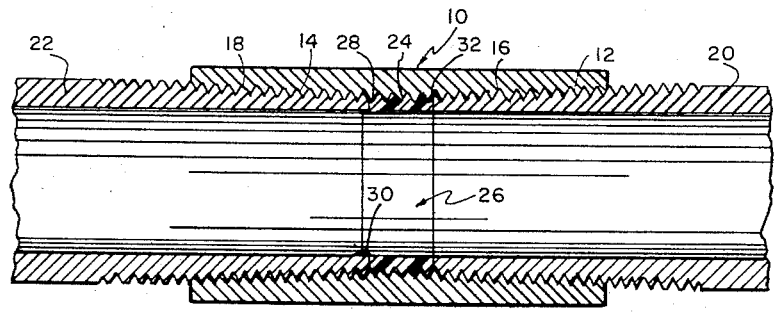

Referring to the drawings, the number 10 designates generally a tubular member having oppositely tapered, internally threaded end portions 12 and 14 for threaded engagement with the externally threaded and tapered end portions 16 and 18 of pipes 20 and 22, respectively. As thus far described, the structure is entirely conventional and the tubular member or coupling 10 is also shown at 24 as being threaded intermediate the adjacent ends of the pipes 20 and 22 as is typical of most commercially available couplings of this character.

The structure shown in FIGURE 1 includes a resilient liner designated generally at 26. The liner 26 constitutes an integral part of the coupling 10 in that the liner 26 is securely bonded to the shoulder 28 constituted of the end of the pipe 22. Furthermore, the liner 26 in thin and feathered or tapering section overlaps the shoulder 28 or end of the pipe 22 as shown at 30, with such lip portion 30 also being firmly bonded to the pipe 22. The liner 26 is also firmly bonded to the threaded portion 24 of the tubular member 10. While the body of the coupling 10 is shown as threaded throughout the axial extent thereof between the adjacent ends of the pipes 20 and 22, as shown in FIGURE 1, this is by no means essential. The threading of the portion 24 is typical of commercial couplings, and while constituting a weakness for corrosion ordinarily does not do so in the practice of this invention because of the bonding. In fact, threading serves to increase the area of and strength of the bonding.

It is to be understood that as shown in FIGURE 1 that the joint or coupling of the pipes 20 and 22 is fully made up in which instance the pipe 20 is compressively engaging and deforming the adjacent end of the liner 26 to a predetermined extent as will be more fully appreciated in the forthcoming description of the method of making and bonding the liner 26. It will suffice for the present to explain that in repose the resilient liner 26 extends somewhat further to the right axially in the tubular member 10 than is shown in FIGURE 1 and is securely bonded to the latter throughout such extent. Thus, the end of the pipe 20 not only compressively engages and deforms the adjacent end of the liner or sleeve 26, but additionally the terminal threads on the end of the pipe 20 partially enter the spaces between threads 32 in the tubular member 10 in which the liner 26 is bonded. Thus, the compressive seal between the end of the pipe 20 and the liner 26 throughout the radial extent of their juncture (it will be noted that as made up that the internal configuration and dimensions of the liner 26 correspond and merge smoothly with those of the pipes 20 and 22) is supplemented very greatly by the resilient material of the bonded liner 26 that is compressively gripped under substantial pressure between the partially meshing threads at the end of the pipe 20.

The coupling structure shown in FIGURE 1 is extremely resistant to leaking. This will be apparent in view of the foregoing paragraph and when the total extent of the bond between the liner 26 and the pipe 22 is considered. With respect to the overlapping portion 30 of the liner 26 it should be observed that it is not essential for the conduit system including the structure shown in FIGURE 1 to be so arranged, as it is preferred that the system be such that fluids flow from right to left as seen in FIGURE 1. This particularly preferred when the fluids contain abrasive solids as the transition of the character of the confining walls is less abrupt and deemed less conducive to turbulence and abrasion of the pipe immediately downstream of the liner 26.

Figures 2, 3:
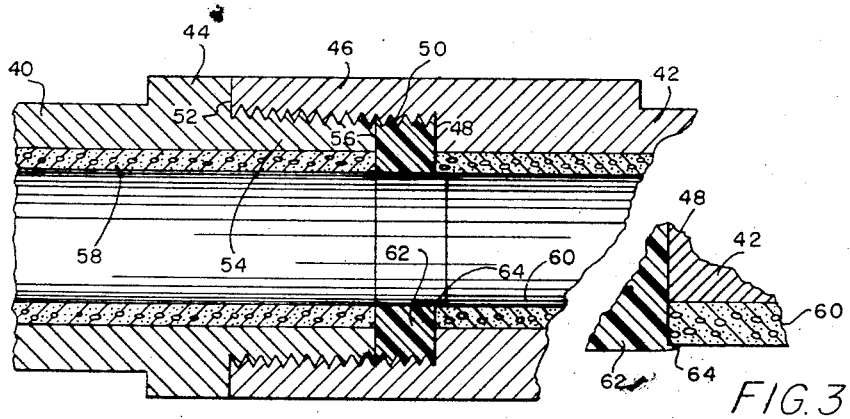
FIGURE 2 is a sectional view similar to FIGURE 1 of a modification of the coupling.
FIGURE 3 is an enlarged sectional detail view of the structure shown in FIGURE 2; and, FIGURE 4 is a central longitudinal sectional view of a coupling similar to that shown in FIGURE 1 during the making thereof, together with a tool used in fixing the length of the liner.

Attention is now directed to the form of the invention shown in FIGURE 2. Here the invention is shown as applied to a conventional flush, high drill joint appriately modified as hereinafter described.

The coupling shown in FIGURE 2 comprises pipes 40 and 42 disposed in end to end relation with their adjacent ends enlarged as at 44 and 46, respectively. The pipe 42 is provided with an internal shoulder 48 and is also provided with tapered internal threads 50 that extend preferably but not necessarily all the way to the shoulder 48.

The pipe 40 terminates in an annular shoulder 52 that surrounds a reduced and tapered extension 54, that is threaded, as shown, to mate with the threads 50 of the pipe 42. When the coupling is fully made up as shown in FIGURE 2, the shouder 52 abuts the end of the pipe 42 while the end 56 of the extension 54 terminates spaced from the shoulder 48. The threads 50, while not necessarily extending all the way to the shoulder 48, do extend at least a part of the interval between the end 56 of the pipe 40 and the shoulder 48. The structure of FIGURE 2 thus far described can be obtained from conventional piping structure by appropriate shortening of the extension 54 to that shown, it being understood that ordinarily such extension as commercially available has a length such as to engage the shoulder 48 or to terminate in very close proximity thereto.

The pipes 40 and 42 can if desired and preferably do include conventional internal protective coatings 58 and 60 such as the illustrated cement linings. Such protective coatings 58 and 60 are quite commonplace and very desirable when the pipes 40 and 42 are to be used in connection with fluids corrosive and/or particularly abrasive to the basic material of the pipes 40 and 42. The instant invention has applicability to the pipes 40 and 42, lined or unlined with protective coatings, and the coatings or linings 58 and 60 can in the following discussion be considered as integral parts of the pipes 40 and 42. In further regard to the matter of protective coatings, it should be amply apparent to those skilled in the art that the pipes 20 and 22, though shown as being of homogeneous composition, can (like pipes 40 and 42) be of composite character so as to include such internal protective coatings or linings as may be considered expedient or desirable.

A resilient liner or gasket 62 that corresponds to the previously described liner 26 is diposed in the space between the shoulder 48 and the end 56 of the pipe 40. The liner 62 is bonded to the threads 50 and the shoulder 48 including the continuation thereof constituted of the coating 60. In fact, the entire contacting area of the liner 62 with the body of all portions of the pipe 42 is bonded and voids excluded from therebetween. The liner 62 also includes a tapered lip portion 64 (see detail of FIGURE 3) that is also bonded to the portion of the pipe 42 constituted of the coating or layer 60. In repose, the liner 62 has a greater axial length than as shown, and is bonded to the threads 50 throughout such greater axial extent, whereby the liner 62 is in axial compression by the pipe 40, at least in the vicinity of the end 56 thereof. Also, the terminal threads on the extension 54 compressively grip the portion of the liner 62 most remote from the shoulder 48. This latter function is analogous to the thread gripping action previously described in connection with FIGURE 1.

The functions of the form of the invention shown in FIGURE 2 will certainly not require detailed discussion for those modestly conversant in the art, especially in the light of the previous discussion of the form of the invention shown in FIGURE 1. The only elaboration deemed of value at this point is the fact that the length of the liners 26 and 62 in repose exceeds their lengths upon the making up of their respective joints of couplings by a more or less fixed amount that is relatively independent of the length of the liner when compressed in use. Such fixed amount, things other than length of the liner being constant, tends to fix the compressive force against the free end of the liner (that is the end remote from the shoulders 28 or 48) for the reason that the bonding of the entire axial extent of the liner materially reduces the extent that the liner can yield axially under compression along its length. Considering the size of the pipe and the specific character of the liner material, it is a simple matter thought to be well within the capabilities of those active in the art to select or adjust the value of the fixed amount such that no tearing away of bonded areas or any rupture or tearing of the liner will occur during making up a joint or coupling, whereby any particular coupling or joint can be repeatedly made up and torn down without any serious loss in efficiency of the joint or coupling.

Though other procedures for making the described joints or couplings will probably come readily to mind, it has been found that the hereinafter described process of making and bonding the liners results in a superior product.

While the process can of course be carried out in a central plant or factory, the process enjoys as will be seen the important advantage of being able to be carried out by a single individual in the field or at a remote location to fit any specific problem or environment, and requires a bare minimum of basic materials and tools.

Figure 4:
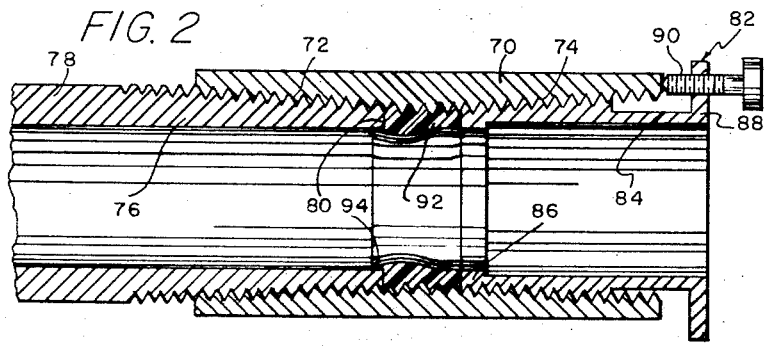

For a thorough and complete understanding of the preferred process attention is directed to FIGURE 4, wherein a liner analogous to that shown at 26 in FIGURE 1 is shown in the course of fabrication.

In FIGURE 4, the number 70 indicates a conventional coupling having oppositely tapered, internal threads 72 and 74. Initially, the coupling is firmly and finally made up on the threaded and tapered end 76 of a pipe 78. The pipe 78 can if desired be provided with an internal protective coating; however, in any event the inside of the pipe 78 adjacent its end 80, and the exposed inside of the coupling 70 adjacent the end 80 must be in suitable condition for bonding. Generally such conditioning will require cleaning mechanically as by using a wire brush or sand blasting, so as to remove oil or grease, rust, mill scale, loose materials and any other chemicals or contaminants that might deter the bonding or adhesion action to be obtained.

On the well founded assumption that considerable variation particularly as to threads occurs as to the various couplings such as the one shown at 70, and with respect to the pipes to be connected by the coupling, it will be further assumed that the actual spacing between the end 80 of the pipe 78 and the end of the pipe (not shown) with which the coupling is to be made up with is known (such distance being known in the art as the back off area or distance), a blind designated generally at 82 is adjusted to suit the circumstances as now described.

The blind 82 comprises a tubular member 84 having a tapered and threaded end portion 86 for cooperation with the coupling threads 74, the threaded end of the tubular member 84 is provided with a radially inwardly projecting annular flange 86 having an internal diameter equal to the internal diameter of the pipe 78. The other end of the tubular member 84 is provided with a radially outward projecting flange 88 through which an axially extending adjustment screw 90 is threaded to bear against the end of the coupling 70, as shown. The screw 90 is adjusted to limit threaded penetration of the blind 82 into the coupling 70 so that the spacing of the flange 86 from the end 80 of the pipe 78 is in excess of the previously determined back off distance. This excess is on the order of from about one-eighth to three-sixteenth inch for one inch to twelve inch pipes by way of example.

Prior to positioning the blind 82 as shown in FIGURE 2, the side of the flange 86 remote from the flange 88 is conditioned to prevent or substantially reduce any adhesion or bonding action between the material of the liner and the blind 82. This is most easily accomplished by suitably coating such parts of the blind 82 as may be necessary with a substance resistant to adhesion or bonding. Suitable choice of a coating for this purpose is of course dependent upon the material selected for the liner; however, liquid silicones work very well with most of the types of liner materials used.

Following the cleaning of the pipe 78 and the coupling 70, it is always preferred and is in fact obligatory where essential to bonding to apply a suitable primer to the areas thereof to which the liner is to adhere or be bonded. Generally, such priming is done just before the blind 82 is threaded into the coupling 70.

After the blind 82 is coated by a suitable release agent as required and positioned in the coupling 70, and after the cleaning and priming have been completed, the liner material is positioned, shaped and bonded in position. The liner can be made of various materials that are commerically available and widely distributed. Though not intended to be limited to such materials, neoprene putties can be mentioned by way of example. Preferably, a neoprene putty should have a solids content of at least about 80%, of which at least about 40% should be sulfur-modified neoprene. The specific gravity should be from about 1.1 to about 1.4 and have a viscosity of about $8 \times 10^5$ to about $12 \times 10^5$ centipoises at 77° F. When neoprene putty is used, a low viscosity neoprene can be used as a primer for outstanding bonding action. This primer can be brushed on or sprayed to the approprtate surfaces as desired.

At an appropriate time interval prior to the application of the neoprene putty (usually as short as possible) the neoprene putty is mixed with an appropriate amount of curing or polymerizing agent (usually an alkali or alkaline earth oxide) sometimes referred to as an accelerator. Military Specification Mil–15058A gives details of a suitable neoprene material.

The condensation polymer of organic dichlorides (such as ethylene chloride) and sodium tetrasulfide such as marketed under the trademark "Thiokol," for example, is also well suited for the practice of the invention. A typical putty of this type should have about the same physical properties as given above for neoprene putty. With a "Thiokol" putty, the use of a low viscosity polymer of the same character is recommended for use as a primer. Prior to use of the "Thiokol" putty, the same is mixed with a suitable curing or polymerizing agent such as lead peroxide.

The character of materials such as given above and their use to make molded polymerized products or coatings is well known. Other commercially available materials suitable for molding and bonding products having the class designation of elastomers are well known with others being constantly developed through research. Other well known and suitable materials are butyl rubbers, vinyl putties, epoxy resins, and urethane rubbers, though this list is far from exhaustive. Use of these and equivalent materials for the purposes of the instant invention is plainly within the capabilities of those skilled in the art.

The instant invention is not primarily concerned with nor to be limited to the use of any specific material for the liner (though neoprene and "Thiokol" materials are presently preferred mostly because of their resistance to petroleum oils), but is primarily concerned with and directed to the process of applying, shaping and bonding a material such as exemplified by those named above during the time that such material is polymerizing or curing to become an impervious, resilient solid or elastomer having characteristic rubber-like properties, and being resistant to attack by many common chemicals. Formation of the liner in this manner makes for a superior bond and a liner that conforms to contacting parts perfectly even when in repose.

While it may be possible to apply the material of the liner while still in a plastic state by conventional pressure type nozzles or the like with appropriate manipulation of the nozzle and/or coupling, experience has indicated in field type operations that uniformly good results are obtained upon applying the material by hand, and such mode of application is decidedly preferred.

The best mode of hand application involves keeping the surfaces wetted by ethyl alcohol or other suitable agent to prevent adherence of the material to the hands. The material is applied to the surfaces to which it is bonded and is preferably built up to its desired shape in thin layers with great care being exercised to express all air from between the coated parts and the material of the liner. It is extremely important and essential that the presence of voids be kept to a minimum. Voids if allowed to remain result in a weakness in the finished liner and frequently cause blisters on the internal surface of the liner during the setting or curing of the latter.

The thin layers of material are most conveniently applied and entrained or trapped air most easily excluded particularly from within the grooves or valleys in threaded areas if a quantity of material is worked or rolled between the hands to form a worm-like length of the same of say about two to four inches in length and then building the layer up by pressing the same into position progressively along its length in the form of a spiral or helix or part of such curve. This operation is repeated for a sufficient number of times to build up and obtain the desired final shape of the liner 92 including the lip portion 94. The hand shaping and pressing of the liner 92 and lip 94 is continued until the material has acquired sufficient strength to be self-supporting, and is then allowed to cure or set for a sufficient additional period as to be in condition for use. This additional interval is usually from about 24 to about 72 hours for the above described neoprane or "Thiokol" materials, though this interval is usually given by the manufacturer of any particular type of raw materials that may be used. Ordinarily it is prudent to inspect the liner a time or two very early in the setting or curing period. If such early inspections indicate any flow or deformation has occurred under the influence of gravity, it is normally a simple matter to reform the shape desired and to then allow the curing period.

To avoid any serious adhesion between the liner and the blind 82, the latter is preferably removed as soon as it is ascertained with certainty that the liner 92 and its lip 94 will permanently retain their desired configuration.

A preferred refinement in the configuration of the internal surface of the liner 92 is that the same has a concaved surface such as to become essentially cylindrical during the compression thereof occasioned by making up the coupling or joint. This configuration is similar in some respects to that of the gasket disclosed in U.S. Patent No. 2,805,872, entitled "Lined Pipe Coupling with Internally Flush Gasket" issued to B. I. Routh, Sept. 10, 1957. Contrary to the patented gasket, which is uniformly concaved throughout nearly its entire length, the liner of this invention is concaved to a progressively greater extent adjacent the free end of the liner 92 (the end remote from the lip 94). This refinement is most pronounced in longer liners and is due to the fact that axial compression of the liner 92 is a decreasing function with increasing distance from the free end thereof because of the exterior being bonded to a surface that remains essentially constant in length.

After the liner 92 and its lip 94 have cured, the coupling is made up on the other pipe (not shown) to result in a final assembly analogous to those shown in FIGURES 1 and 2.

While the invention has been shown with respect to pipes and fittings having metal bodies such as steel, it is to be clearly understood that the invention is applicable to any sort of pipe materials or coupling materials to which the liner can be securely bonded, such as many types of thermoplastic and thermosetting plastics (polyethylene, polyvinyl chlorides, phenolic epoxy resins, and phenolic laminates, for example), glass, concrete, and various composition materials, such as the carbon based substance sold under the trademark "Carbate," and cement and asbestos (such as sold under the trademark "Transite").

The hand application of the material of the liner is of course limited to sizes that will accommodate the hand or finger (for smaller sizes mechanical applicators, gun nozzles or the like must be resorted to); however, it will be appreciated that the structural features of the product are of value for any size of pipe or tubing.

It will be understood that both ends of the coupling 10 of FIGURE 1 can be completed using blinds, whereby each end of the liner is like the right-hand end of the same as seen in FIGURE 1. Of course, in this case each end of the liner is "free" in the sense that this word has been used previously. Hence, the liner will be concaved when in repose adjacent each end as is the right end of the liner shown in FIGURE 4.

The liner of the invention can have reinforcing embedded therein, as in prior art gaskets, but such provision is hardly necessary for either high or low pressures within the coupling. Obviously, the coupling and pipe support the liner against high internal pressures. In the case of low or vacuum internal pressures, the ambient pressure cannot gain radial access to the liner so as to collapse the latter. Even if some radial access were to occur in a limited area, it is plain that adjacent bonded areas of the liner would support the unbonded limited area.

The seal afforded by the liner at its "free" end is due to the axial compression of the rubber-like liner coupled with the bond of the latter to the coupling. The seal at the "free" end is substantially augmented by the portion of the liner compressed and forced against the threads to which it is bonded and the tensile stresses within the body immediately in the vicinity, that is, from the part of the liner squeezed in the threads around the threaded extremity of the male fitting and on into the body of the liner.

Inasmuch as the apparatus and method of the invention are each subject to numerous minor variations from the drawings and the foregoing description without departing from the spirit of the invention, attention is directed to the appended claim in order to ascertain the actual scope of the invention.

I claim:
1. In a coupling construction structure comprising a tubular member having a tapered internally threaded portion, said tubular member having an internal shoulder facing said threaded portion and an end of the member, a resilient and impervious liner in said tubular member spaced from said end of the member and having an axial extent from the shoulder to include a part of the threaded portion of the tubular member, and said liner being securely bonded to the tubular member throughout its axial extent and also being bonded securely to the shoulder, wherein the internal surface of the liner is concaved with the concave curvature being greatest adjacent to the end of the liner remote from the shoulder.

References Cited

UNITED STATES PATENTS

| | | | |
|---|---|---|---|
| 595,437 | 12/1897 | Greenfield | 285—53 |
| 1,859,311 | 5/1932 | McEvoy | 285—333 |
| 2,374,138 | 4/1945 | Sanford | 285—383 |
| 2,690,934 | 10/1954 | Holcombe | 285—55 |
| 2,761,702 | 9/1956 | Noel | 285—355 |
| 2,805,872 | 9/1957 | Routh | 285—55 |
| 3,167,333 | 1/1965 | Hall | 285—333 |

FOREIGN PATENTS 754,702   8/1933   France.

CARL W. TOMLIN, *Primary Examiner.*

D. W. AROLA, *Assistant Examiner.*

U.S. Cl. X.R.

285—291, 332.2, 355, 369